US008423523B2

(12) United States Patent
Vergnory-Mion et al.

(10) Patent No.: US 8,423,523 B2
(45) Date of Patent: Apr. 16, 2013

(54) APPARATUS AND METHOD FOR UTILIZING CONTEXT TO RESOLVE AMBIGUOUS QUERIES

(75) Inventors: Gilles Vergnory-Mion, Vaueresson (FR); Jean-Yves "Yannick" Cras, Paris (FR); Pascale Mariani, Fresnes (FR); Yann Delacourt, Maisons-Laffitte (FR)

(73) Assignee: SAP France S.A., Paris (FR)

( * ) Notice: Subject to any disclaimer, the term of this patent is extended or adjusted under 35 U.S.C. 154(b) by 593 days.

(21) Appl. No.: 12/270,763

(22) Filed: Nov. 13, 2008

(65) Prior Publication Data

US 2010/0121837 A1 May 13, 2010

(51) Int. Cl.
*G06F 7/00* (2006.01)
*G06F 17/00* (2006.01)

(52) U.S. Cl.
USPC ............ 707/705; 707/713; 707/716; 706/12; 706/14; 706/19

(58) Field of Classification Search .................. None
See application file for complete search history.

(56) References Cited

U.S. PATENT DOCUMENTS

| | | | |
|---|---|---|---|
| 5,555,403 A | 9/1996 | Cambot et al. | |
| 6,460,043 B1* | 10/2002 | Tabbara et al. | 1/1 |
| 6,493,701 B2* | 12/2002 | Ponnekanti | 1/1 |
| 6,609,123 B1* | 8/2003 | Cazemier et al. | 1/1 |
| 6,792,414 B2 | 9/2004 | Chaudhuri et al. | |
| 6,801,904 B2 | 10/2004 | Chaudhuri et al. | |
| 2002/0078015 A1* | 6/2002 | Ponnekanti | 707/1 |
| 2003/0217048 A1 | 11/2003 | Potter et al. | |
| 2004/0111410 A1* | 6/2004 | Burgoon et al. | 707/4 |
| 2004/0243618 A1* | 12/2004 | Malaney et al. | 707/102 |
| 2005/0027681 A1* | 2/2005 | Bernstein et al. | 707/1 |
| 2005/0050068 A1* | 3/2005 | Vaschillo et al. | 707/100 |
| 2005/0144073 A1* | 6/2005 | Morrisroe et al. | 705/14 |
| 2005/0246314 A1* | 11/2005 | Eder | 707/1 |
| 2006/0161554 A1* | 7/2006 | Lucovsky et al. | 707/10 |
| 2006/0167865 A1* | 7/2006 | Andrei | 707/4 |
| 2006/0184473 A1* | 8/2006 | Eder | 706/20 |
| 2007/0033159 A1* | 2/2007 | Cherkauer | 707/2 |
| 2007/0168334 A1* | 7/2007 | Julien et al. | 707/3 |
| 2007/0226203 A1* | 9/2007 | Adya et al. | 707/4 |

(Continued)

FOREIGN PATENT DOCUMENTS

EP 1486890 A2 12/2004

OTHER PUBLICATIONS

Pieringer, R.; Elhardt, K.; Ramsak, F.; Markl, V.; Fenk, R.; Bayer, R.; Karayannidis, N.; Tsois, A.; Sellis, T.;, "Combining hierarchy encoding and pre-grouping: intelligent grouping in star join processing," Data Engineering, 2003. Proceedings. 19th International Conference on , vol., No., pp. 329-340, Mar. 5-8, 2003.*

*Primary Examiner* — Angelica Ruiz
(74) *Attorney, Agent, or Firm* — Mintz, Levin, Cohn, Ferris, Glovsky and Popeo, P.C.

(57) ABSTRACT

A computer readable storage medium includes executable instructions to derive from a database schema an irreducible ambiguous group comprising a sub-schema with a set of vertices wherein any two vertices are part of a loop. Contexts are defined on the sub-schema. For each context, joins in the sub-schema are designated as mandatory joins, excluded joins and neutral joins. A selection of a context from multiple contexts invoked by a path characterizing a query is processed. The query is resolved using the context.

11 Claims, 27 Drawing Sheets

U.S. PATENT DOCUMENTS

2007/0250470 A1* 10/2007 Duffy et al. ............... 707/2
2007/0271570 A1* 11/2007 Brown et al. ............. 718/105
2008/0027930 A1   1/2008 Bohannon et al.
2008/0033914 A1*  2/2008 Cherniack et al. .......... 707/3
2008/0046462 A1   2/2008 Kaufman et al.
2008/0256069 A1* 10/2008 Eder ........................... 707/5

* cited by examiner

APPARATUS AND METHOD FOR UTILIZING CONTEXT TO RESOLVE AMBIGUOUS QUERIES

FIELD OF THE INVENTION

This invention relates generally to processing information in databases. More particularly, this invention relates simplified techniques for forming contexts to resolve queries applied to databases.

BACKGROUND OF THE INVENTION

U.S. Pat. No. 5,555,403, which is incorporated by reference herein, discloses techniques for associating user-friendly business names to database entities. Those business names (sometimes referred to as "business objects") may then be used to form a query applied to a database. In particular, one or more SQL statements are formed to retrieve database values. For instance, on might associate the business objects "Revenue" and "Customer" and retrieve the revenue generated by each customer across all products and time periods. One could also associate the objects "Product" and "Revenue" and retrieve the revenue generated by each product across all customers and time periods. Such queries can also specify restrictions and allow, for instance, for retrieving the revenue for each customer for a specific product.

Frequently, the intuitive meaning of a query associating two or more objects is very clear and unambiguous. However, there are cases where a single association of multiple business objects may have different plausible meanings. For instance, assume that customers can rent products or buy them (or both). A query associating the two objects "Customer" and "Product" would be ambiguous. One may want to retrieve some association between customers and products, but this query alone does not tell if the user wants to know which customers have bought which products, or which customers have rented which products, or both. The computer system cannot solve this ambiguity. Instead, a user needs to provide some additional information and to choose between the different possible interpretations of the query.

In order to enable this, a system may rely upon the notion of context. A context is a list of joins between tables. A context allow for more precision when forming a query. In the previous example, the designer may have authored a context of sales and a context of rentals. By picking one context, or both, the user can specify which of the possible interpretations of the query was contemplated.

Today, a context works in the following manner. Each business object used in a query relates to one or several tables in a database. Any two database tables may be related by zero, one or more "joins", that represent ways of relating data from one table with data from the other. For instance, an object "Customer" may be related to a database table "CUST". The object "Products" may be related to the table "PROD". A measure "Rentals" may be related to FACT_RENT and a measure "Revenue" may be related to the table FACT_SALES. The two tables "FACT_RENT" and "FACT_SALES" are fact tables: each of them contains foreign keys to both the "CUST" and "PROD" dimension tables. Thus, in this example there are four joins.

In order to retrieve the data for a query, one has to select which of the "joins" will be used to combine data from the different tables associated with the objects in the query. In mathematical terms, one wants to relate all the tables pertaining to objects in a query using a list of joins, so that the resulting graph is a tree (a graph without loops, in which exactly one list of joins relates any two tables). For instance, when analyzing the query "Customer, Revenue", the two tables CUST and FACT_SALES will be selected. The system will then look for joins that can relate the tables. In particular, the system will attempt to find the join that relates the customer foreign key in FACT_SALES to the customer information in table CUST.

An ambiguity exists in a query if more than one possibility exists, i.e, if there are multiple joins that could be used to relate all the tables in a query. This is the case for the query ("Customer, Product"), because two lists of joins could be used to relate the tables CUST and PROD. One could either use the two joins that go through FACT_SALES, or the two joins that go through FACT_RENT. Such situations occur each time the graph that contains tables as nodes, related by joins as edges, has a loop.

In traditional tools, a context is a list of joins. By specifying a context, one specifies that all the joins used to relate the tables underlying objects in a query must belong to this context. If the context is correctly built, it contains only one list of joins that can accommodate a given query. In the previous example, a context called "sales" would only contain the two joins that relate the FACT_SALES table with the two dimension tables CUST and PROD. By choosing this context, all the joins used to relate elements of a query belong to this context. Therefore, the query "Customer, Product" becomes unambiguous.

The current notion of context, however, suffers from a major drawback. A context is a list of joins. If new tables with new join possibilities are added to the underlying database, they also need to be added to all existing contexts. Consequently, the cost of maintaining contexts is high.

Moreover, in order to cover all possible cases, one needs to secure enough contexts to resolve all loops. The number of requested contexts may become prohibitive when dealing with large database schemas or with federated multi-source schemas. It is not uncommon to have to accommodate hundreds of contexts. The cost of creating and maintaining these contexts can become unbearable.

Accordingly, it would be desirable to introduce a new technique for processing contexts. Such a technique should reduce the number of contexts and the cost of creating and maintaining contexts. Such a technique should be largely automated so that the maintenance of contexts is simplified.

SUMMARY OF THE INVENTION

The invention includes a computer readable storage medium with executable instructions to derive from a database schema an irreducible ambiguous group comprising a sub-schema with a set of vertices, wherein any two vertices are part of a loop. Contexts are defined in the sub-schema. For each context, joins in the sub-schema are designated as mandatory joins, excluded joins and neutral joins. A selection of a context from multiple contexts invoked by a path characterizing a query is processed. The query is resolved using the context.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
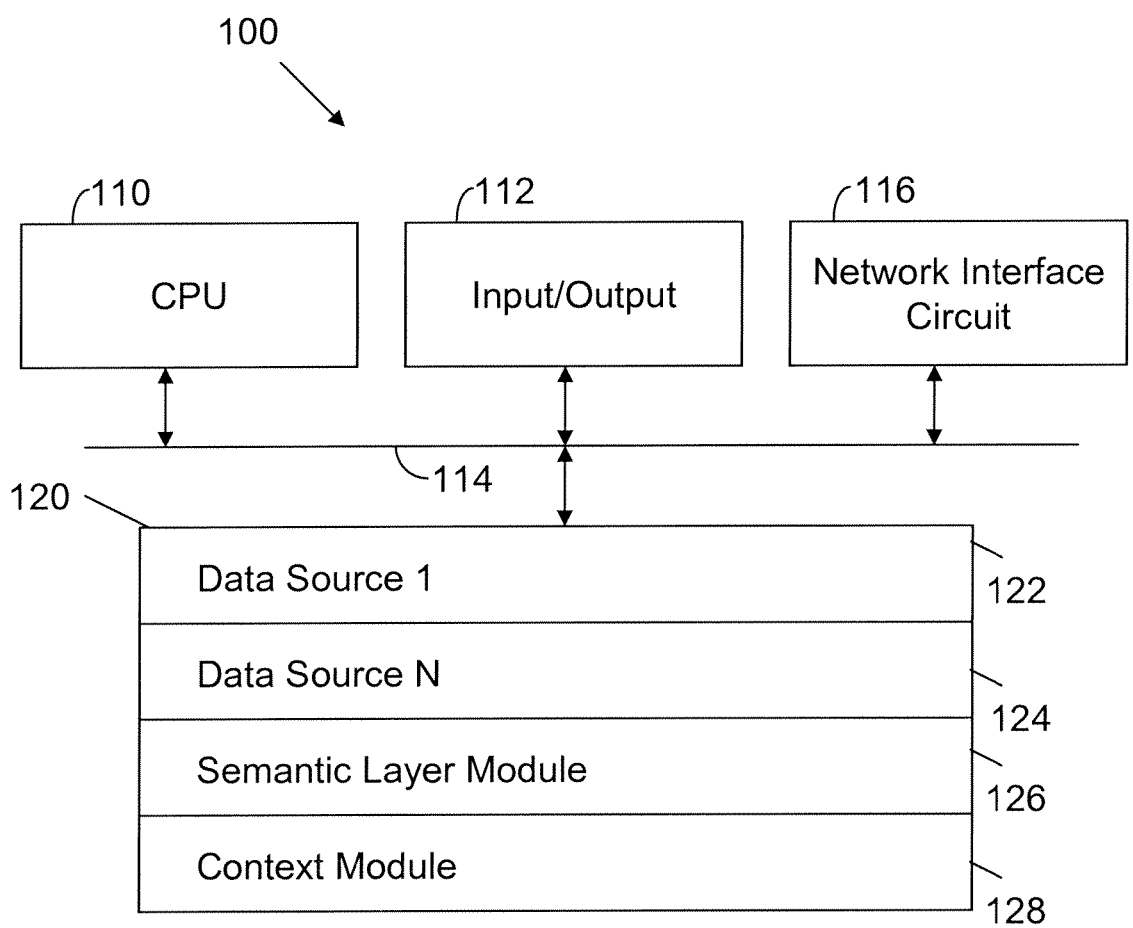
FIG. 1 illustrates a computer configured in accordance with an embodiment of the invention.

FIG. 1 illustrates a computer 100 configured in accordance with an embodiment of the invention. The computer 100 includes standard components, such as a central processing unit (CPU) 110 connected to a set of input/output devices 112 via a bus 114. The input/output devices 112 may include a keyboard, mouse, display, printer and the like. Also connected to the bus 114 is a network interface circuit 116 to allow connectivity to a network (not shown). Thus, the computer 100 may operate in a networked environment.

A memory 120 is also connected to the bus 114. The memory 120 includes data and executable instructions to implement operations of the invention. For example, the memory 120 may store one or more data sources (e.g., databases) 122, 124. Thus, the invention is operative to support queries from multiple sources. A semantic layer module 126 supports the implementation and utilization of a semantic layer. A semantic layer is a business representation of corporate data that helps end users access data autonomously using common business terms. A semantic layer maps complex data into familiar business terms such as product, customer, or revenue to offer a unified, consolidated view of data across the organization. By using common business terms, rather than data language, to access, manipulate, and organize information, it simplifies the complexity of business data. These business terms are stored as objects in a universe, and are accessed through business views. Universes enable business users to access and analyze data stored in a relational database and OLAP cubes. This is core business intelligence (BI) technology that frees users from IT while ensuring correct results.

A context module 128 includes executable instructions to implement operations of the invention. In particular, the context module 128 includes executable instructions to form contexts, as described below. The context module 128 communicates with the semantic layer module 126, such that the semantic layer module can rely upon the contexts to simplify query processing.

The context module 128 may use a metadata layer that represents graphs containing vertices related by edges that can be mapped on top of one or more physical data sources. Different graphs that map to one of several distinct data sources can be assembled into a composite graph through additional edges. These graph processing operations are discussed in detail below.

The modules in memory 120 are exemplary. The modules may be combined and/or be distributed across a network. It is the operations of the invention that are significant, not the precise manner or location at which those operations are performed.

Figure 2:
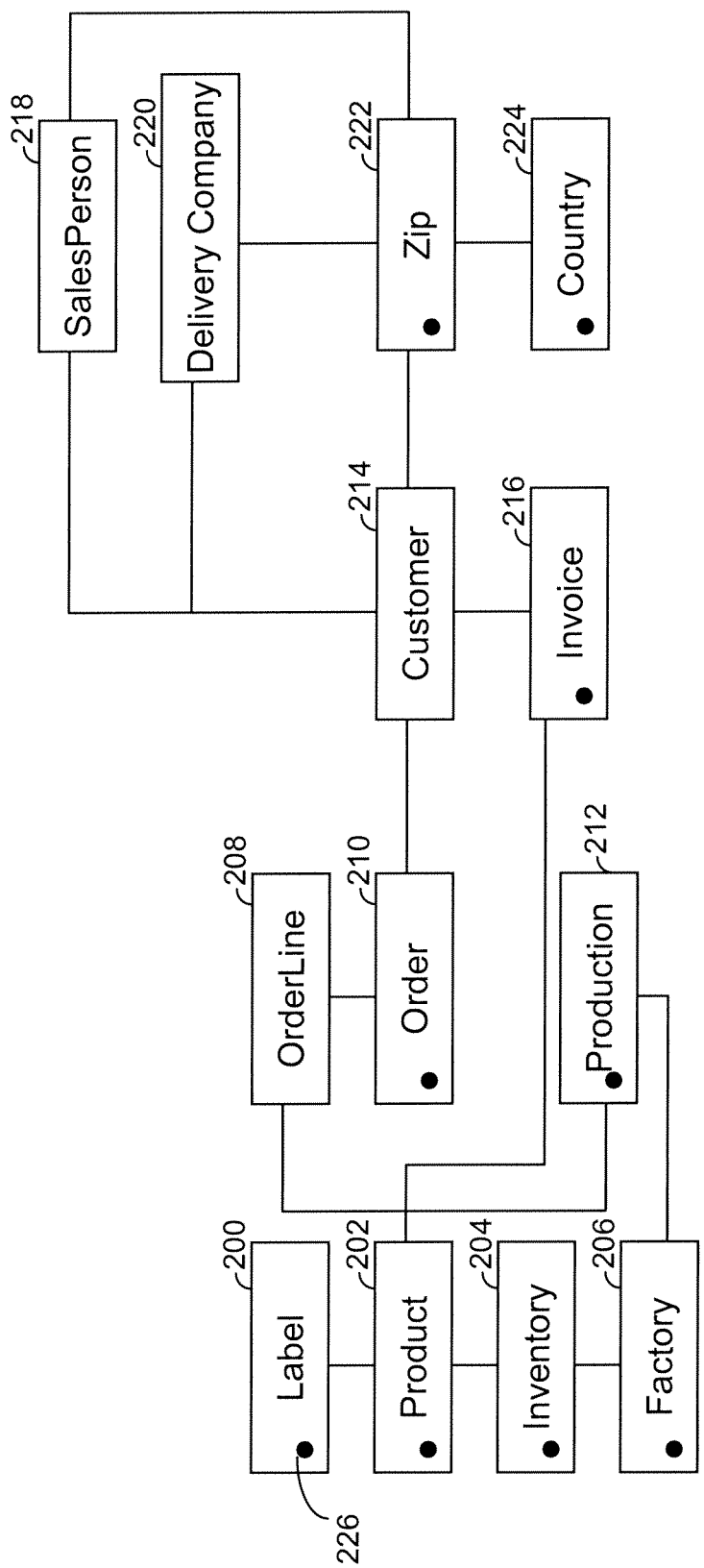
FIGS. 2-27 illustrate exemplary node processing operations performed in accordance with embodiments of the invention.

FIG. 2 illustrates an exemplary database schema that is processed in accordance with an embodiment of the invention. The schema includes a set of objects 200-224 related as a graph. When a database table is used in the definition of an object from the semantic layer, it is referred to as an "object table" and is designated with a dark circle 226. In this example, "Product" 202, for instance, is an object table, while "OrderLine" 208 is not.

This schema supports a high-level analysis of product orders, sales, production and inventory across geographies.

Note that the invention is disclosed using graphs. The graphs do not depend on the fact that nodes represent physical tables and links represent physical joins. Therefore, the same techniques can be used to solve queries on different data sources that are exposed as graphs.

A graph is a pair (N, A), where N is a set of vertices (e.g., tables, entities) and A is a set of edges (e.g., joins, relations). In this disclosure, graphs are considered non-directed. A graph may be characterized in metadata of a data source.

An edge has two endpoints in a set of vertices; an edge connects or joins the two endpoints. An edge can therefore be defined as a set of two vertices. Two vertices are adjacent if they are related by an edge. Two edges are adjacent if they have a common vertex. The degree of a vertex is the number of edges that it has. A leaf is a vertex with a single degree.

A path is a collection of linked edges and vertices. Two vertices M and N are connected in G if they are the same or if there exists a vertex P that is adjacent to M via an edge A(M,P) and that is connected to N in G-{A(M,P)}. A path between M and N is therefore a sequence of adjacent and distinct edges wherein M and N are two vertices. A path between M and N is minimal if, by removing an edge from it, one can no longer relate M and N.

A loop is a non-empty minimal path relating a vertex to itself. A query is a sub-set of the vertices in a graph. A query path is a minimal path, a tree, that connects all vertices in the query.

Figure 3:
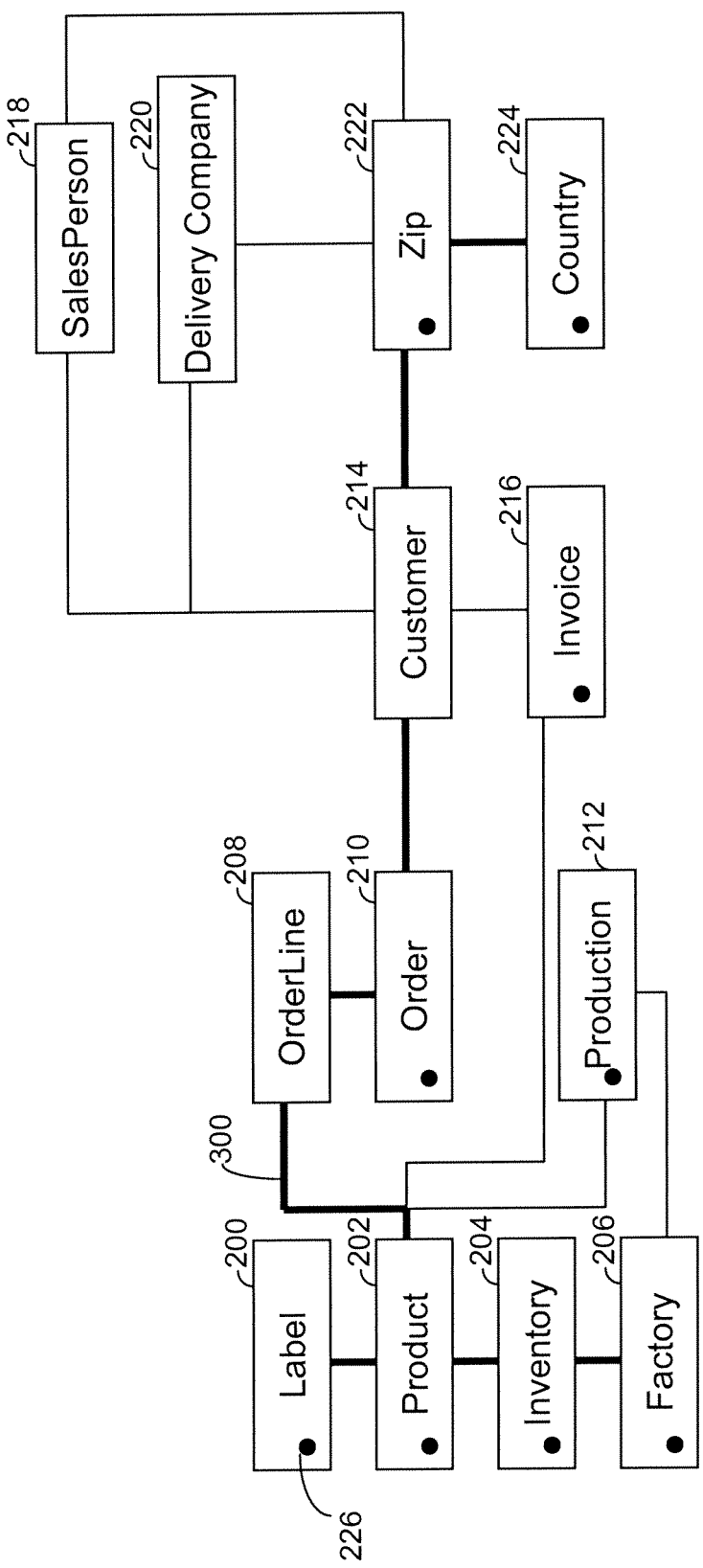

The schema of FIG. 2 contains a large number of loops. To solve all possible query ambiguities on this schema using the current techniques, multiple contexts (indeed, exactly 12) must be created. One context is depicted in FIG. 3, where the joins are highlighted with bold lines 300.

The maintenance cost of such a context can be quite high. For instance, if the database designer adds a new table, "Region", between ZIP 222 and Country 224, then this context (and many others) needs to be adapted.

Note that this context goes across the "Inventory" fact table 204, because the user wants to be able to report on the orders for products stored in different locations. Usually, default contexts do not cross fact tables, so this context should be defined entirely by hand.

Today's contexts are merely a list of joins. In opposition, the new context C, as defined in the invention, is a repartition of all the available joins in the schema into three sets, called "mandatory joins", "excluded joins" and "neutral joins". We designate these sets as C+, C− and C0, respectively.

Figure 4:
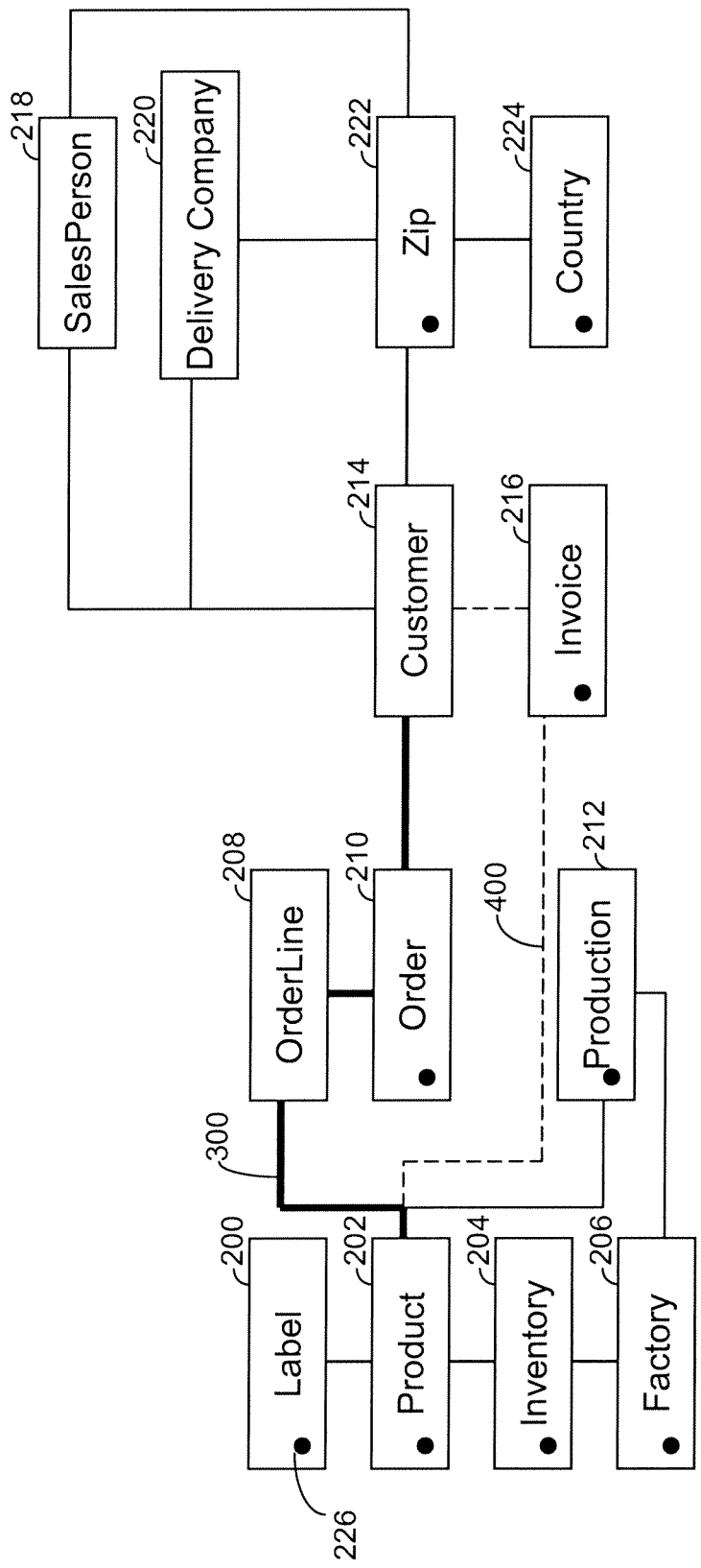

FIG. 4 illustrates a context with mandatory joins indicated in bold 300. The dashed joins 400 are the excluded joins. All other joins are neutral (in subsequent examples neutral joins and tables may be eliminated from a context representation to save space). The context of FIG. 4 forces analysis of the relationship from products 202 to customers 214 through orders 210, as opposed to through invoices 216.

One favorable property of the new context is that a join is "neutral" by default, if it is not explicitly excluded or made mandatory. If new tables and joins are added to the schemas, then the new joins are neutral by default, without the user having to do anything. As this is usually the expected behavior, this means that maintaining the new context requires no or very little action.

Another property of this new context is its locality. The context does not specify anything about the multiple join paths that go from Product 202 to Factory 206, or from Customer 214 to Country 224. It only specifies how to relate products 202 to customers 214 who ordered them. This means that the same context can be used to explore orders of products depending on the factory where they are manufactured or on the factory where they are stored (which may not be the same). With the current technique, two different contexts with many common joins would be required to perform these two analyses.

In accordance with an embodiment of the invention, contexts are designed by hand with little support from the tools in the general case. One context per fact table may be created. This approach works well in certain cases but is not always applicable.

The following discussion illustrates how a convenient and minimal set of contexts can be semi-automatically derived for any given schema. A first automatic step consists of splitting the original database schema, represented by a graph, into smaller parts. Each of these sub-schemas will then be used to create contexts with the user's assistance.

The sub-schemas are called Irreducible Ambiguous Groups (IAGs). An IAG specifies a subset of the initial graph and has a list of tables called "boundary tables" (those who connect the IAG to other parts of the schema). An IAG can be seen as a weakly connected part of the schema in which local contexts can be created to remove local ambiguities. More technically, an IAG is a sub-graph of the schema such that any two vertices are part of a loop and have at least two distinct minimal paths relating them in the IAG. IAGs are the smallest sets of vertices such that each pair of vertices is part of a loop.

The invention provides a method for identifying IAGs that can be processed independently to create contexts and remove ambiguities. The set of IAGs for a schema can be determined using the following exemplary algorithm:

---

0. Build an initially empty list of IAGs. Each IAG specifies a list of contained tables, a list of boundary tables, and a collapsed table associated to it.
1. While there is a loop C in the schema (use a depth-first algorithm, for instance):
   a. If C contains exactly one collapsed table, then
      i. Let G be the corresponding IAG from the list.
      ii. Add all other vertices from C into G
   b. Else if C contains at least two collapsed tables, then
      i. Let Gi be the set of IAGs whose collapsed tables are in C.
      ii. Create a new empty IAG, G
      iii. Add to G all the tables from all Gi
      iv. Add to G all non-collapsed tables from C
      v. Remove all Gis from the list of IAGs.
      vi. Remove the collapsed tables of all Gis.
   c. Else let G be a new IAG containing all tables from C.
   d. End If
   e. Invariant: G contains all tables in C.
   f. If G does not already have a collapsed table GV associated with it, add a new table GV in the schema and note it as the associated "collapsed" table for the IAG.
   g. End if
   h. For Each table V in G
      i. Remove from the schema any join that connects V to another table in G
      ii. If V has at least one remaining join (pointing to a table outside of G) then
         1. identify V as a boundary table of G
         2. Create a join between GV and V
      iii. else remove V from the graph
      i. End For Each
2. End While

---

Figure 5:
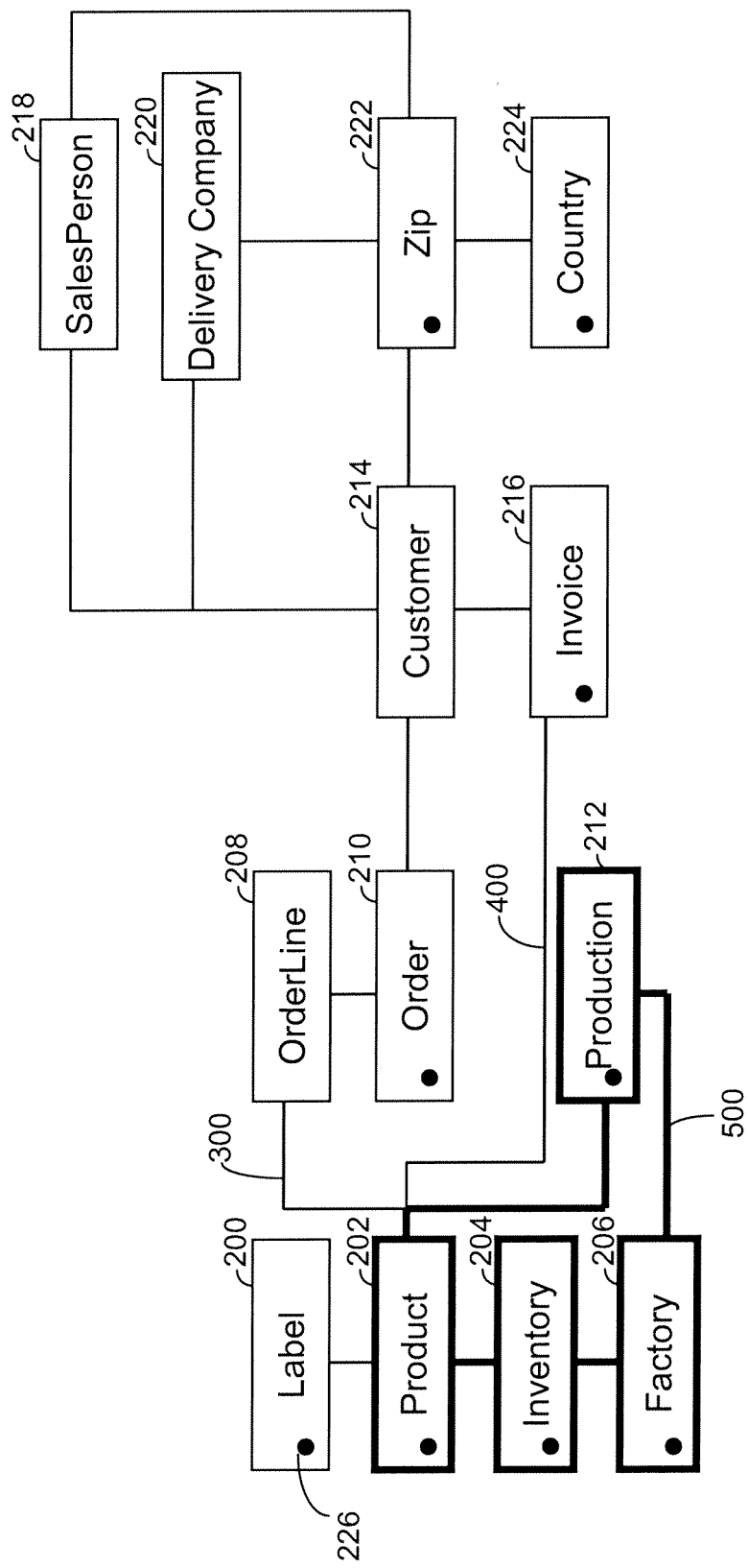

This processing is best illustrated by an example. Consider the schema of FIG. 5. The loop found in the first step is marked in bold and includes 202, 204, 206 and 212 linked by bold lines 200. More particularly, there is a loop connecting Product 202, Inventory 204, Factory 206 and Production 212. Since there is no IAG yet, we create one with these four tables, as described in step 1f. This IAG has one boundary table (Product 202) and can be referred to by the names of its boundary table, "Product".

Figure 6:
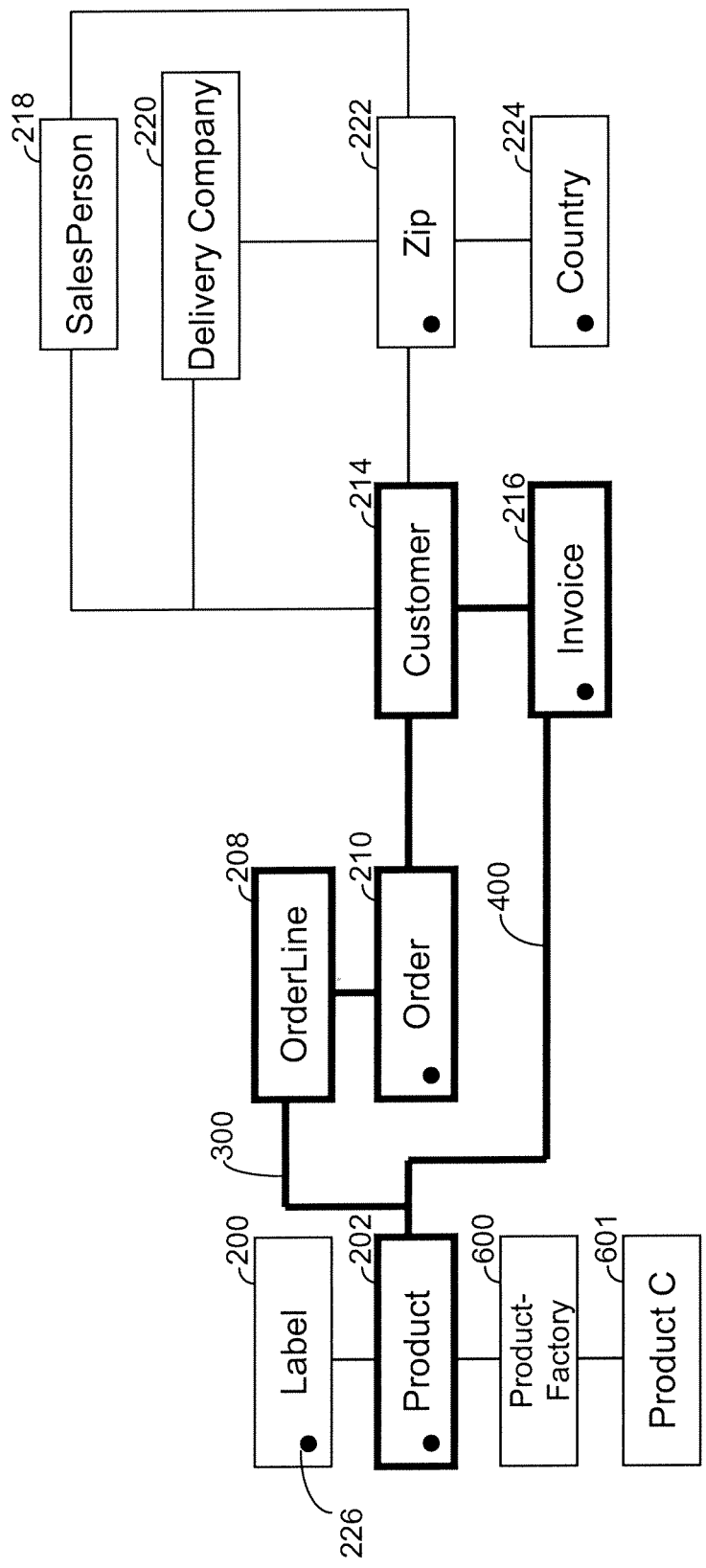

Now, we create a new "collapsed" table that represents this IAG, for instance "Product C" 601. We remap the boundary table to it, and we (temporarily) remove all edges that are internal to the IAG (Inventory 204, Factory 206 and Production 212). This results in the graph of FIG. 6. In this graph there is a new loop that relates Product 202, Order Line 208, Order 210, Customer 214 and Invoice 216.

Figure 7:
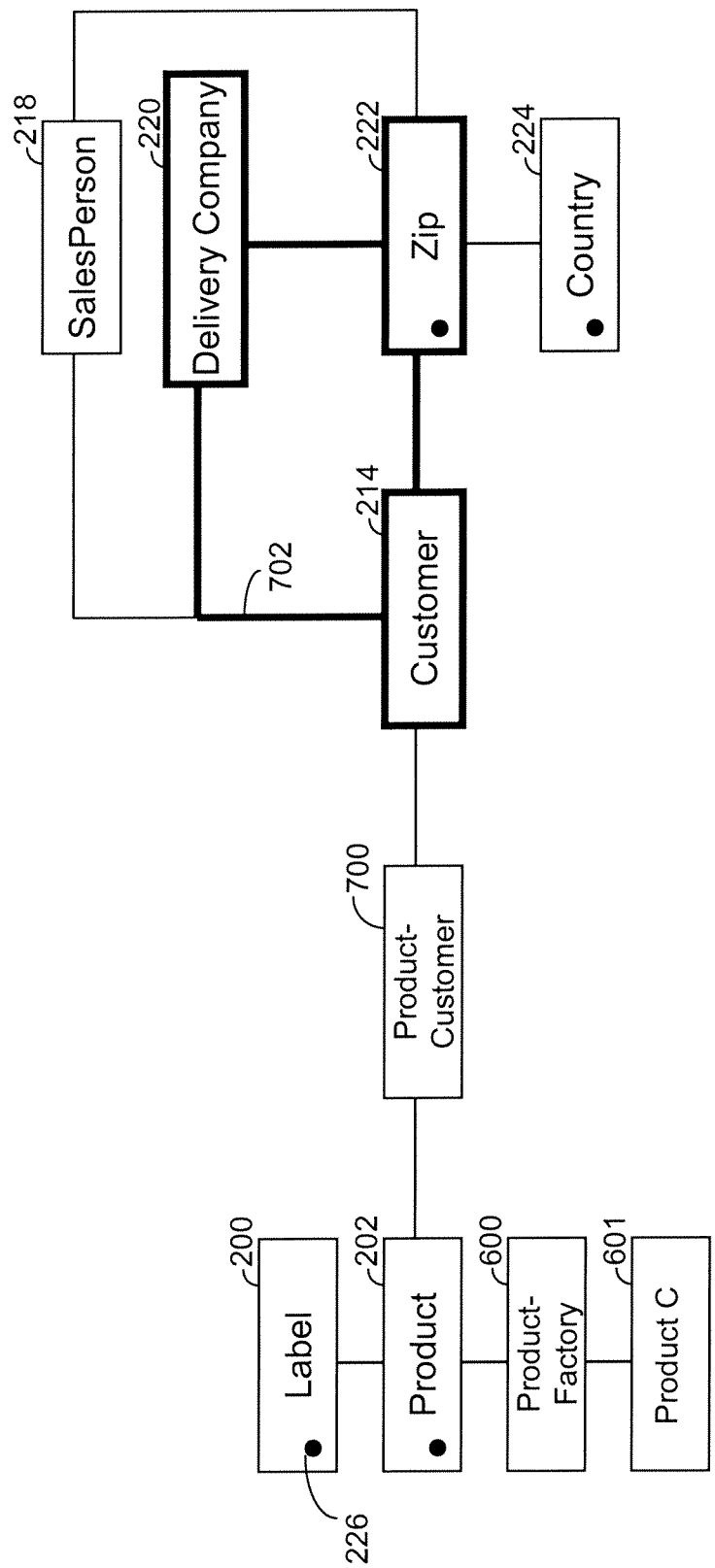
Figure 8:
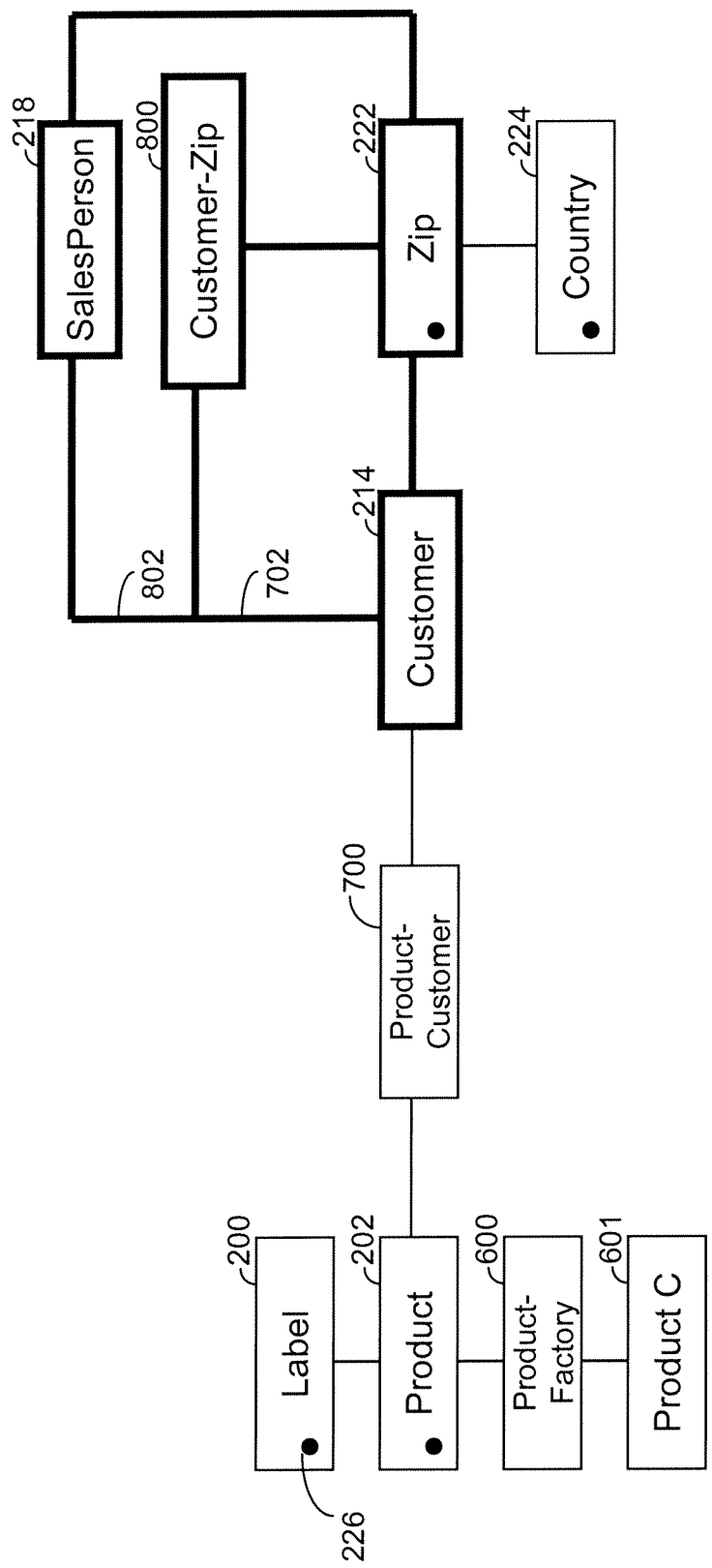
Figure 9:
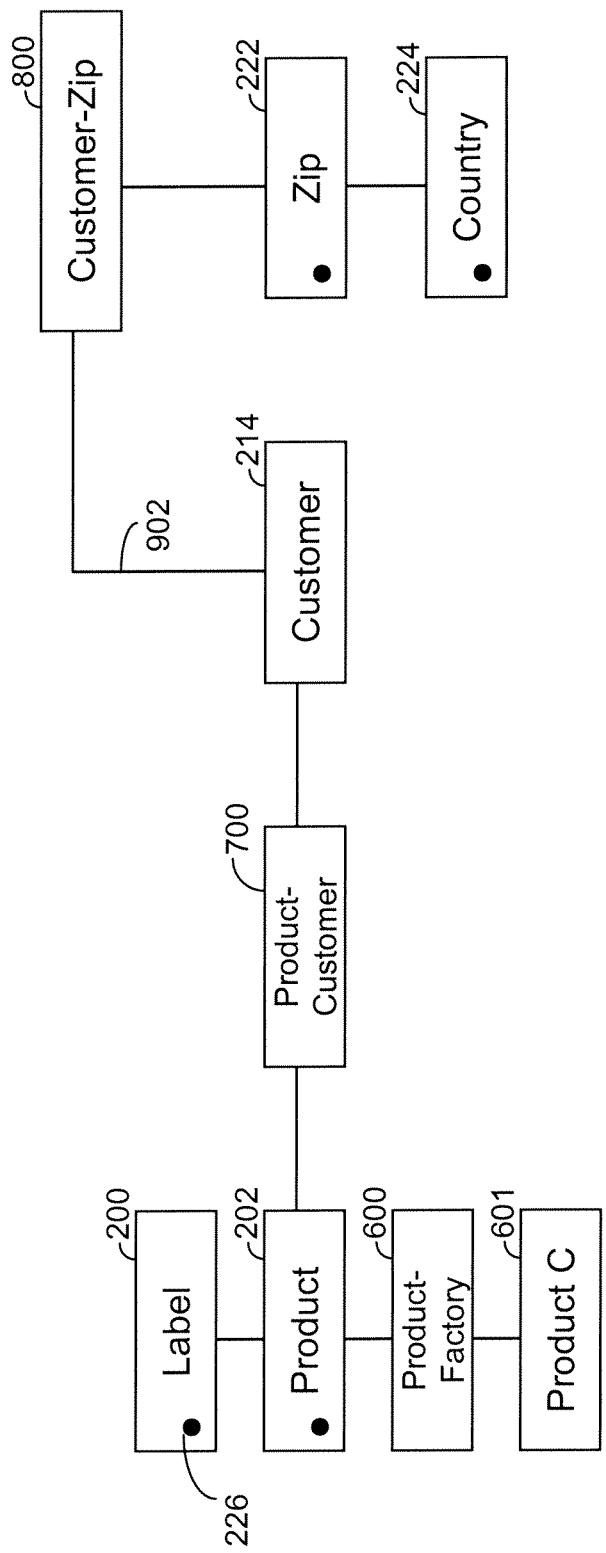

No IAG collapsed table is part of this loop, so we collapse it into a new IAG, "Product-Customer", for which we create a collapsed table 700. This results in a new schema, as shown in FIG. 7. This graph contains another loop. Again, we collapse this loop into a new IAG, the boundary tables of which are Customer and ZIP, which results in the schema of FIG. 8. This one also has two loops that contain the collapsed table for an IAG (Customer-Zip), so we add all tables in the loops to this IAG, which yields the schema of FIG. 9. Since no other loop is found, processing is complete.

Once the set of IAGs is complete, one can look at each of them in turn and create contexts for each. An IAG is typically a strongly connected graph, since there are always at least two paths from any given vertex to any other. Creating contexts is a way of removing the ambiguities of queries that span across this IAG.

The user may then use various techniques to create local contexts for each of the IAGs. If enough information about the cardinality (orientation) of joins is given, one can attempt to create one local context per fact table in each IAG. Another way of way creating contexts is to let the user select certain joins as "excluded". Those are temporarily eliminated from the graph, and we automatically find a tree (a path without loops) that connects all boundary tables of the IAG, plus all the object tables in the IAG. For this, one may use a classic tree search algorithm. The tree provides a set of "mandatory" joins (if no tree is found, the user must reduce the set of "excluded" joins that they had chosen). All other joins in the IAG are "excluded" for this context; all edges that are not in the IAG are "neutral" for this context. By repeating this procedure for all IAGs, one obtains a set of contexts with minimal user intervention.

Figure 10:
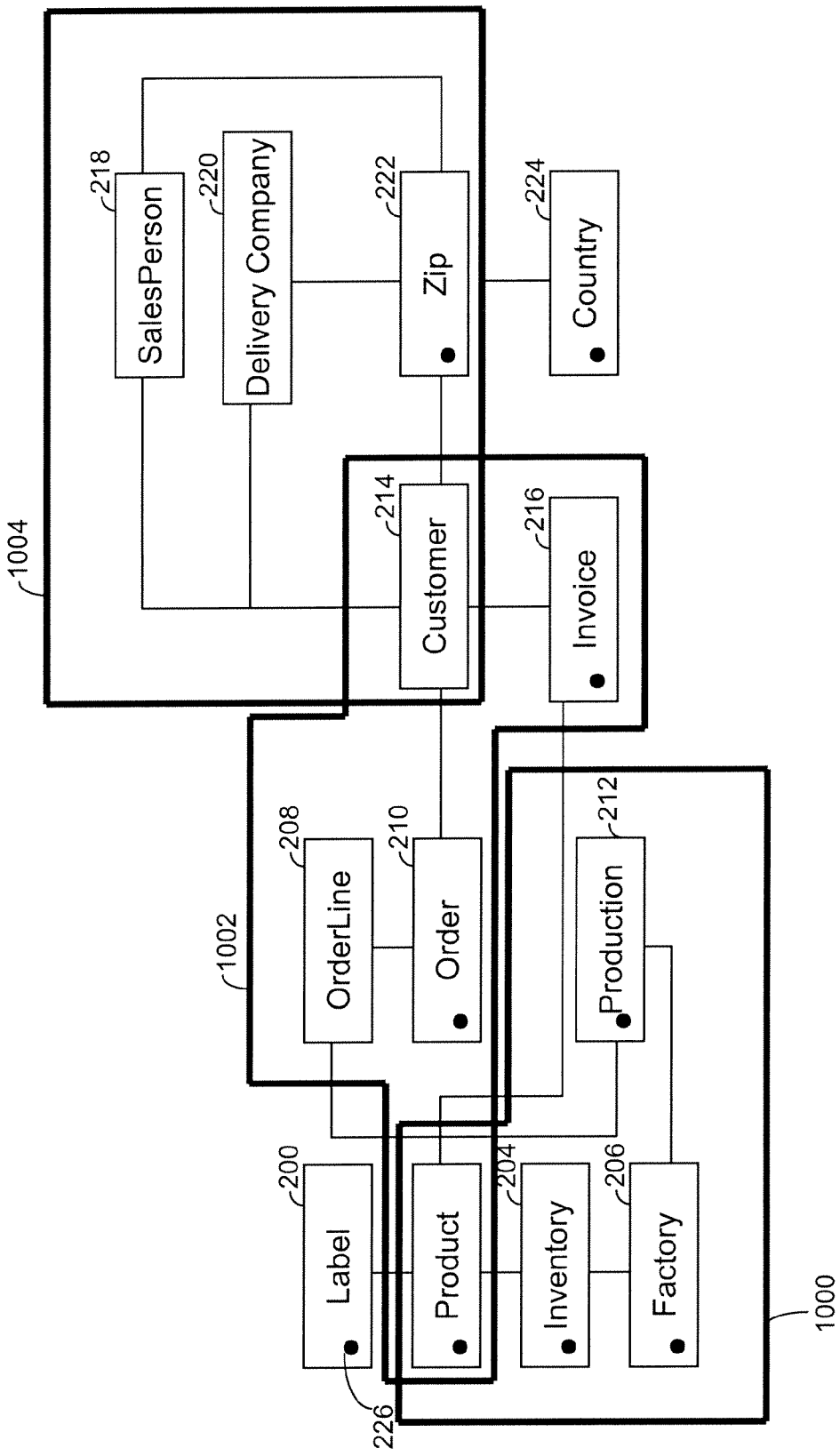

For instance, consider the previously discussed exemplary database schema which is divided into three IAGs: the "Product" IAG 1000, "Product-Customer" 1002; and "Customer-ZIP" 1004, as shown in FIG. 10. Consider the "Customer-ZIP" IAG 1004. First let the user select some vertices that will be "excluded" from the graph. For example, the context module 128 may include executable instructions to display the schema and receive input from the user regarding excluded joins.

Figure 11:
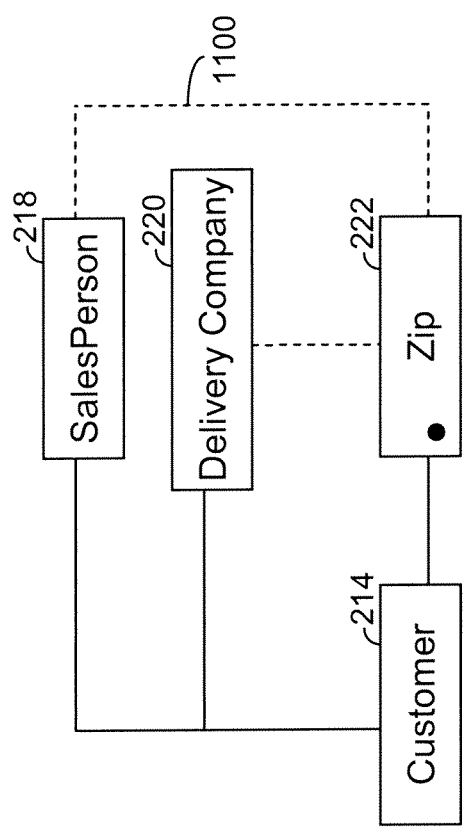

FIG. 11 illustrates excluded joins as dashed lines 1100. In business terms, "excluding" a join between two tables means that, for this context, the user does not want to combine data from those two tables using the selected join. This decision has business semantic meaning and is therefore taken by a user. In the example of FIG. 11, the user states that in this context the ZIP codes of sales people or delivery companies that serve customers should be ignored and only the ZIP code of customers themselves matter. When the user makes this choice, the system should insure that they don't "exclude" too many joins that would make it impossible to connect the boundary tables or the tables that are used in an object of the semantic layer. For instance, when the user decides to exclude the two joins on ZIP, then they should be prevented from removing the last one (which would isolate the ZIP object). This can be done simply, at each interaction step, by finding a tree that relates all the tables in the IAG and making sure that at least one exists.

Figure 12:
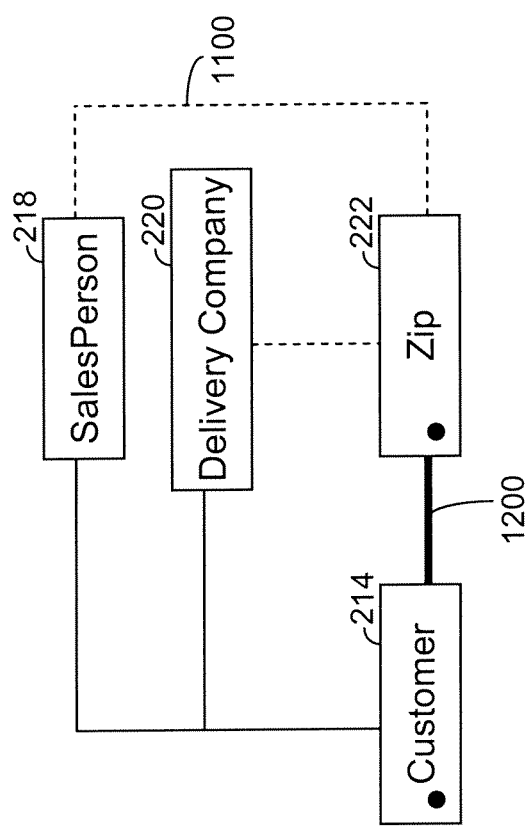
Figure 13:
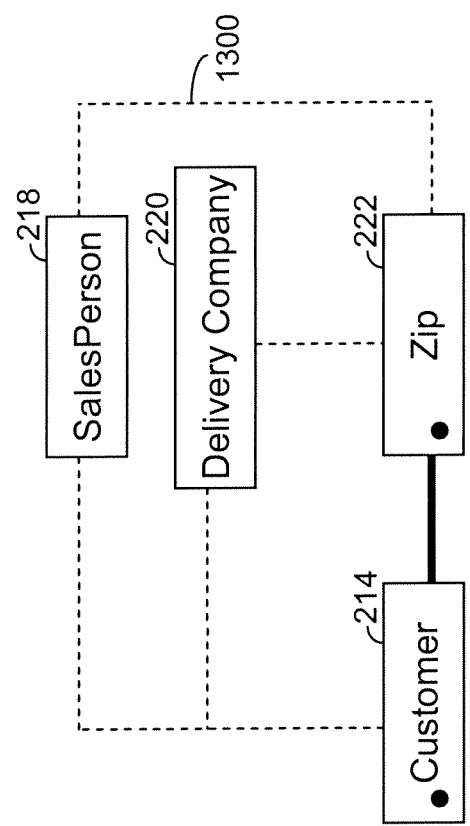

Once the user is done selecting the links to remove, one can then find a tree that relates all boundary tables and object tables. Here, we need a tree that relates the Customer table 214 (a boundary table of the IAG) and the ZIP table 222 (both an object table and a boundary table). This tree is reduced to a single join, as shown in FIG. 12 with a bold line 1200. Last, we automatically create a context where all the joins used in this tree are "mandatory". All other joins from the IAG are "excluded", as shown with dashed line 1300 in FIG. 13. All joins not in the IAG are "neutral". This context is called "Customer's ZIP" as it directly relates the two tables Customer 214 and ZIP 222.

Figure 14:
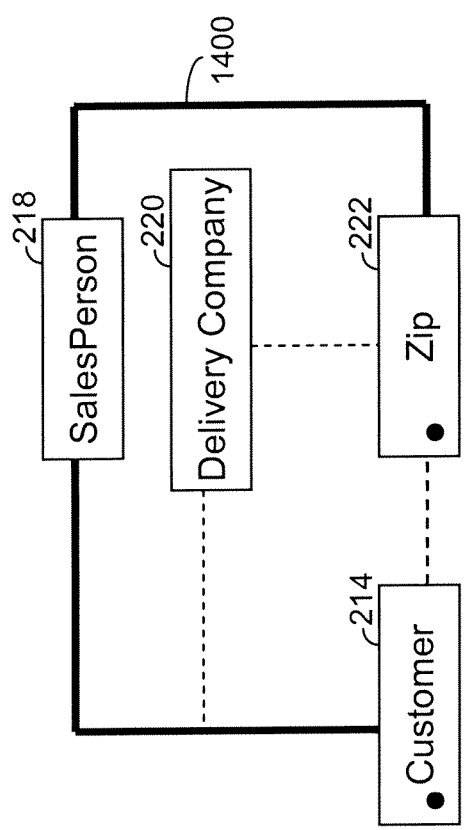
Figure 15:
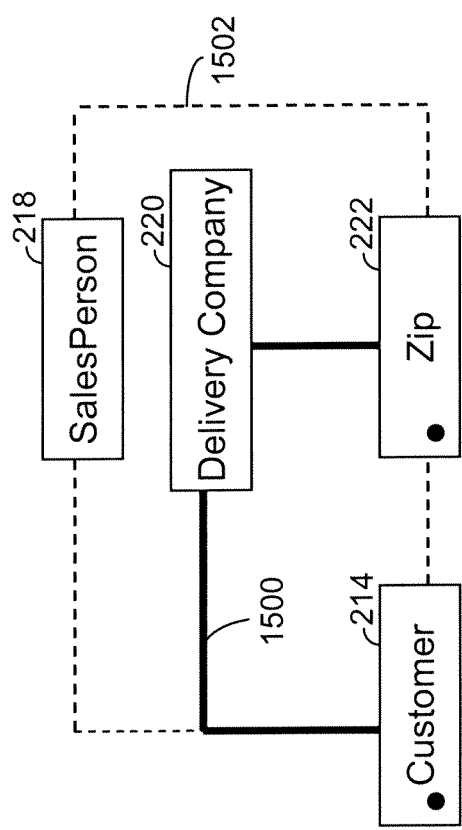

One can then create two other contexts for "Customer-ZIP", one called "SalesPerson", as shown in FIG. 14 and one called "DeliveryCompany", as shown in FIG. 15.

Figure 16:
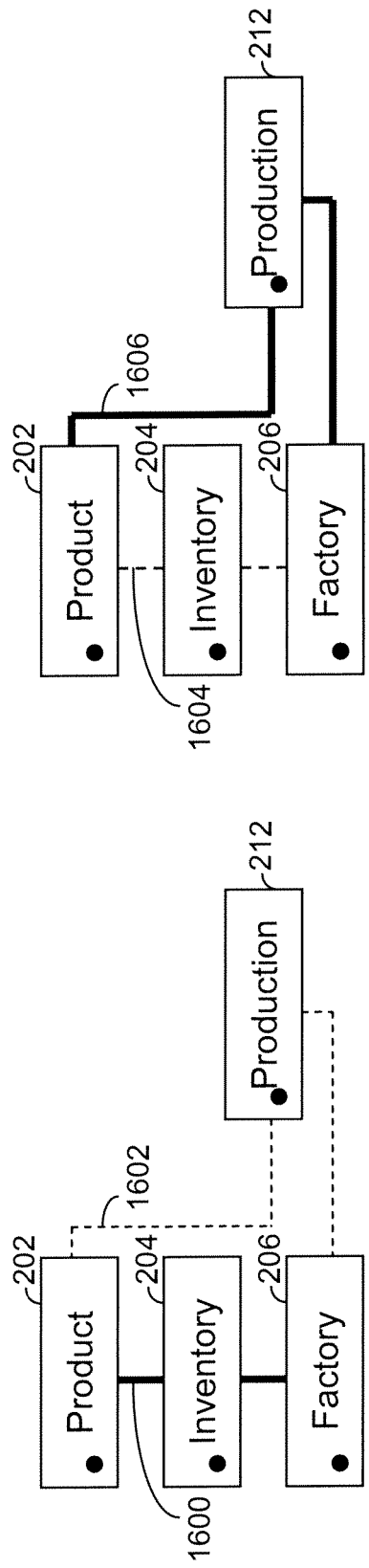
Figure 17:
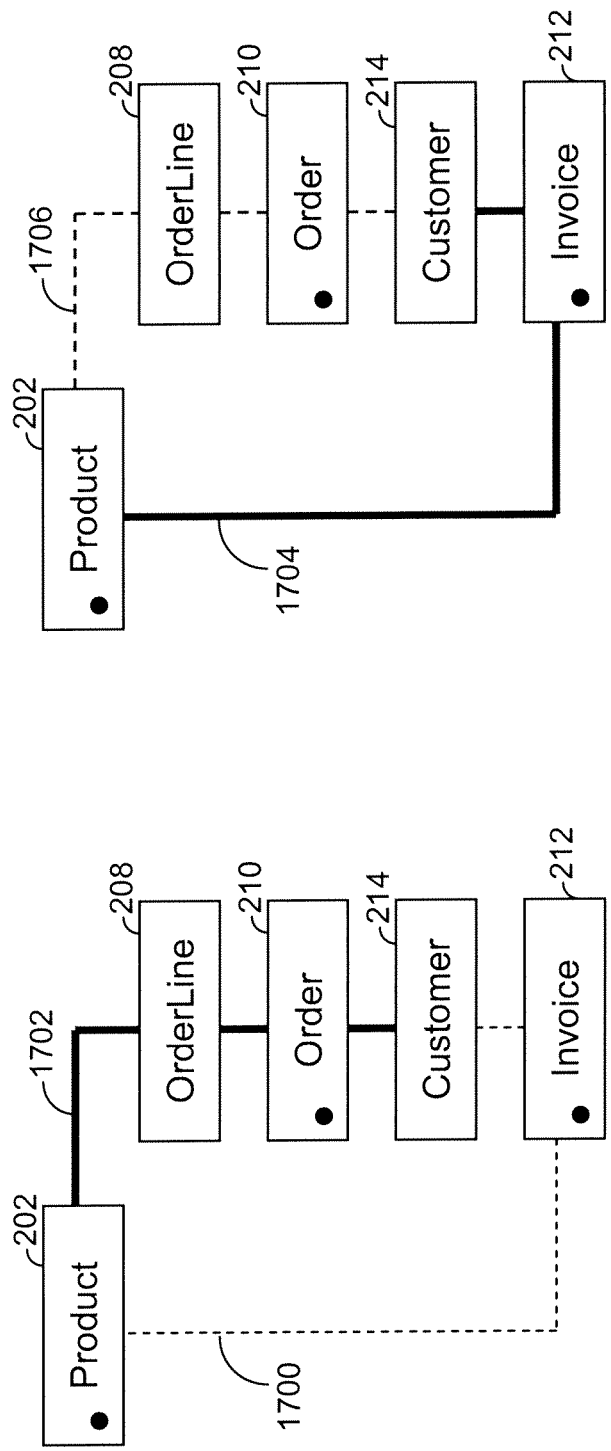

Last, we perform the same operation with the other two IAGs. The "Product" IAG can receive two contexts called "Inventory" and "Production", as shown in FIG. 16. The "Product-Customer" IAG has two contexts, "Order" and "Invoice", as shown in FIG. 17.

It is worth noting that the total number of contexts created this way (7) is substantially smaller than what it would be with the current technology if we wanted to cover all possible analysis paths (12). Each IAG is handled separately and the total number of contexts is the sum of the number of contexts created in each IAG. With the current technology, the number of context would grow exponentially with the number of IAGs (or of loops).

A query may be expressed as a list of objects, all of which relate to some tables in the database schema. Solving the query equates to finding a tree (a join path with no loop) that contains all the tables involved in the definition of objects in the query. In other words, a query is a list of vertices for which values are retrieved from physical data sources they map to. Semantics dictate which one of several possible paths between vertices should be used. Queries need to be disambiguated if several paths are possible between different query items.

Given a graph H and a set of vertices N, a tree connecting all vertices in N is identified or an error is flagged if no such tree exists. Any number of tree finding algorithms may be used in accordance with embodiments of the invention. For instance, the well known depth-first algorithm or the breadth-first algorithm may be used.

A tree search technique that relates all tables in the query or generates an error message may be implemented as follows:

| | |
|---|---|
| 1 | Compute a tree that covers all tables in the query. |
| 2 | If no such tree exists then exit on error : Cartesian query (query is not connected) |
| 3 | For any join A in of that tree that belongs to a loop in the schema: |
| 3.1 | Build a list of all contexts for which A is either mandatory or excluded, and that allows at least one join to each table in the query |
| 3.2 | If the list of candidate contexts is empty then exit on error: loop not handled by any context |
| 3.3 | Let the user pick an element Cx of this list if there are at least two of them; otherwise select the unique element. |
| 3.4 | Remove from the schema all joins "excluded" from Cx |
| 3.5 | Remove Cx from the list of contexts; also remove any context whose mandatory joins are excluded by Cx. |
| 3.6 | If an edge of the current tree is excluded by Cx then |
| 3.6.1 | Re-compute another tree |
| 3.6.2 | If no such tree exists then exit on error: incompatibles objects |
| 3.7 | End if |
| 4 | End for |
| 5 | Return the tree |

Observe that there is an interactive component in which the user selects a context to resolve an ambiguity (i.e., step 3.3). Therefore, minimizing a cost function to determine a best solution is not required.

This technique is applied to an example that uses the previously discussed schema. Consider the query "Inventory per Country". This query contains several ambiguities:

Do we want the countries of customers, or of their sales people or delivery companies?

Do we want the inventory for products ordered by customers or for products invoiced to them?

Figure 18:
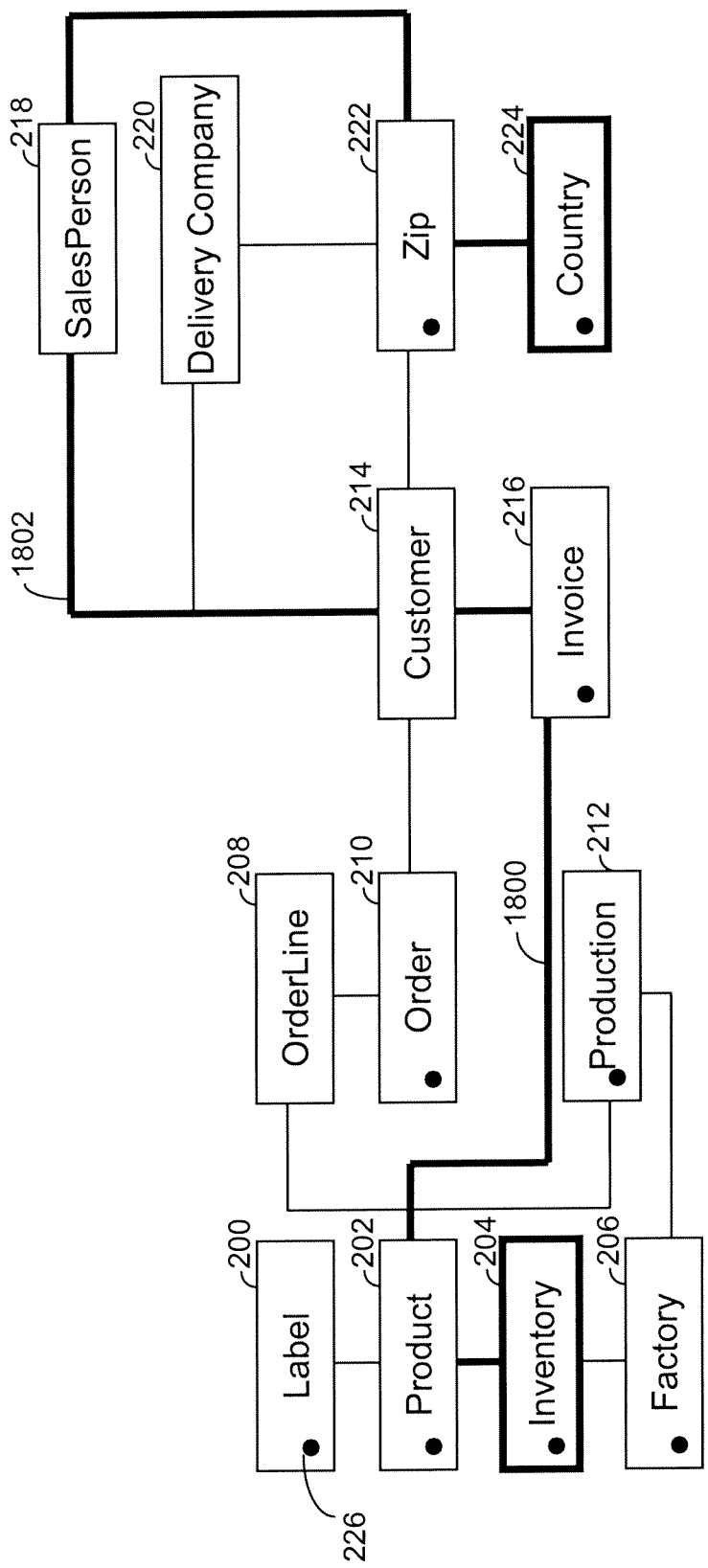
Figure 19:
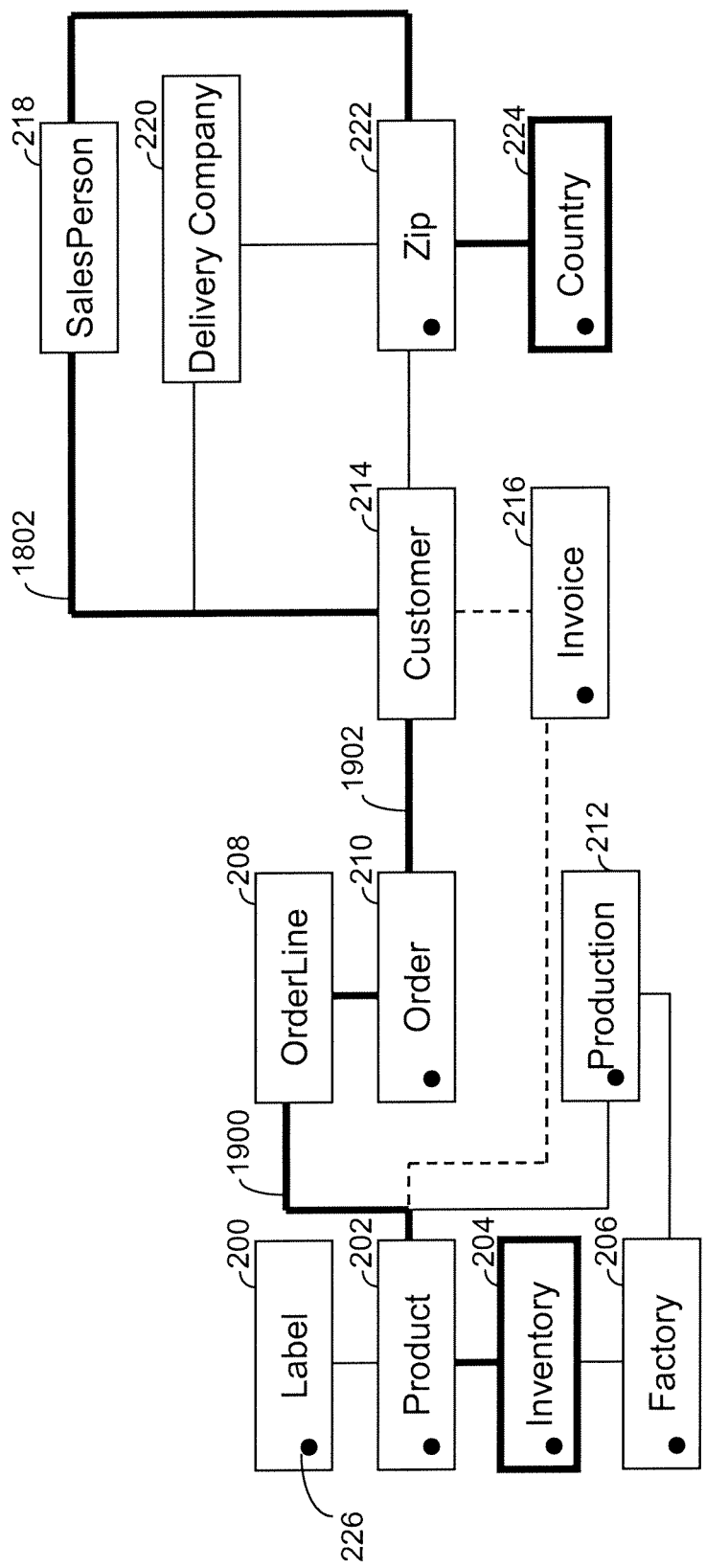

First compute an arbitrary tree that relates these two tables. Such a tree is shown in FIG. 18. Identify the join between Product 202 and Invoice 216 that is part of a loop. Look for any context that excludes this join or makes it mandatory. The two contexts "Order" 210 and "Invoice" 216 that were defined for the IAG "Product-Customer" qualify. The user is then allowed to select a context. Assume that the user selects the "Order" context. We apply this context by removing all the joins that it excludes. Since the previously found tree used some joins now excluded by this context, we re-compute another tree, for instance, to create the tree of FIG. 19.

Because we removed from the original schema all joins excluded by the "Order" context (those are depicted as dashed in the figure), many of the joins used in the new tree do not belong to a loop anymore. However, the join between Customer and SalesPerson does. This join is either mandatory or excluded in the three contexts that were created for the "Customer-ZIP" IAG of our schema, namely the "Sales Person", "Delivery Company", and "Customer's ZIP" contexts.

Figure 20:
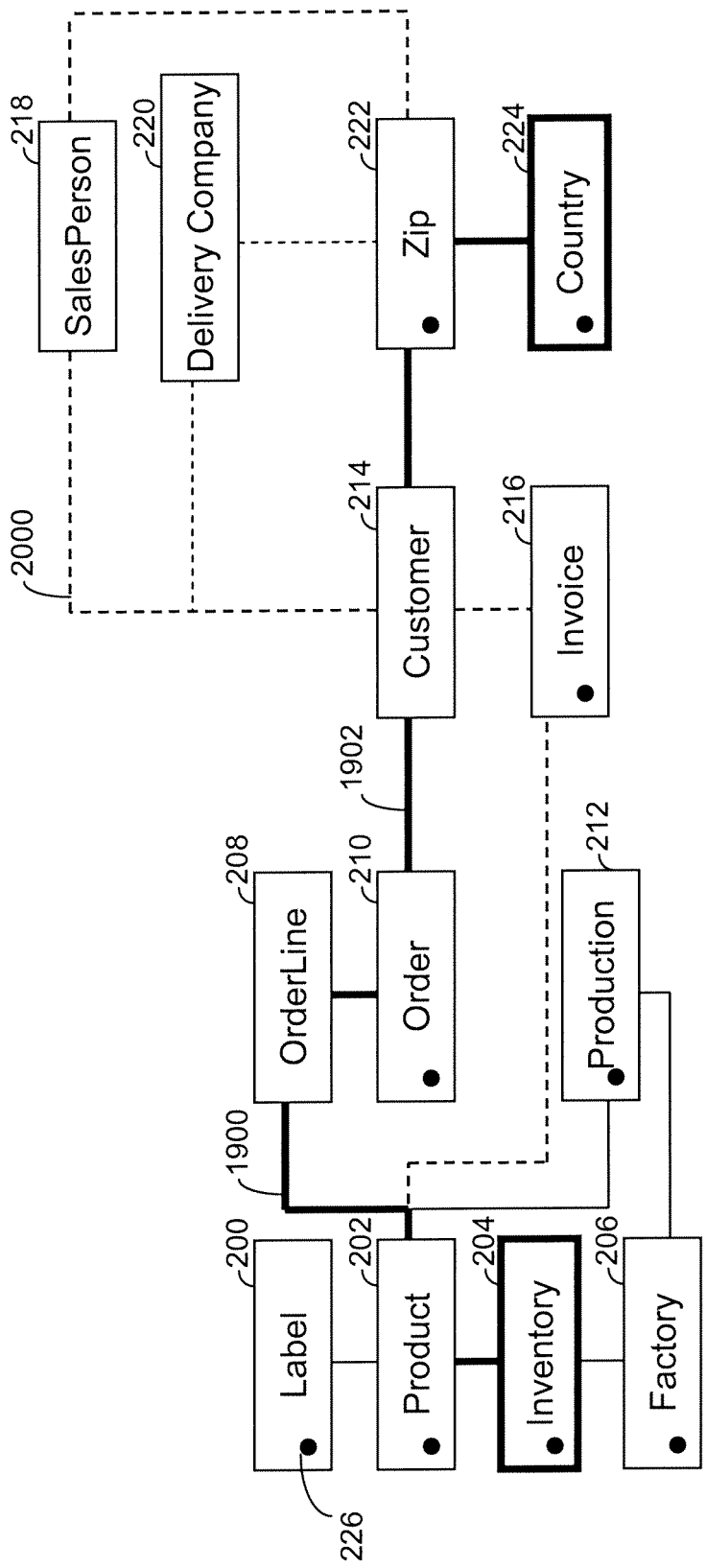

So these three contexts are proposed to the user. The latter wants to report inventory based on the customer's location, so he selects the "Customer's ZIP" context. We remove from the schema all joins excluded by this context, and we re-compute a tree relating the two tables in the query, which yields the tree of FIG. 20.

Figure 21:
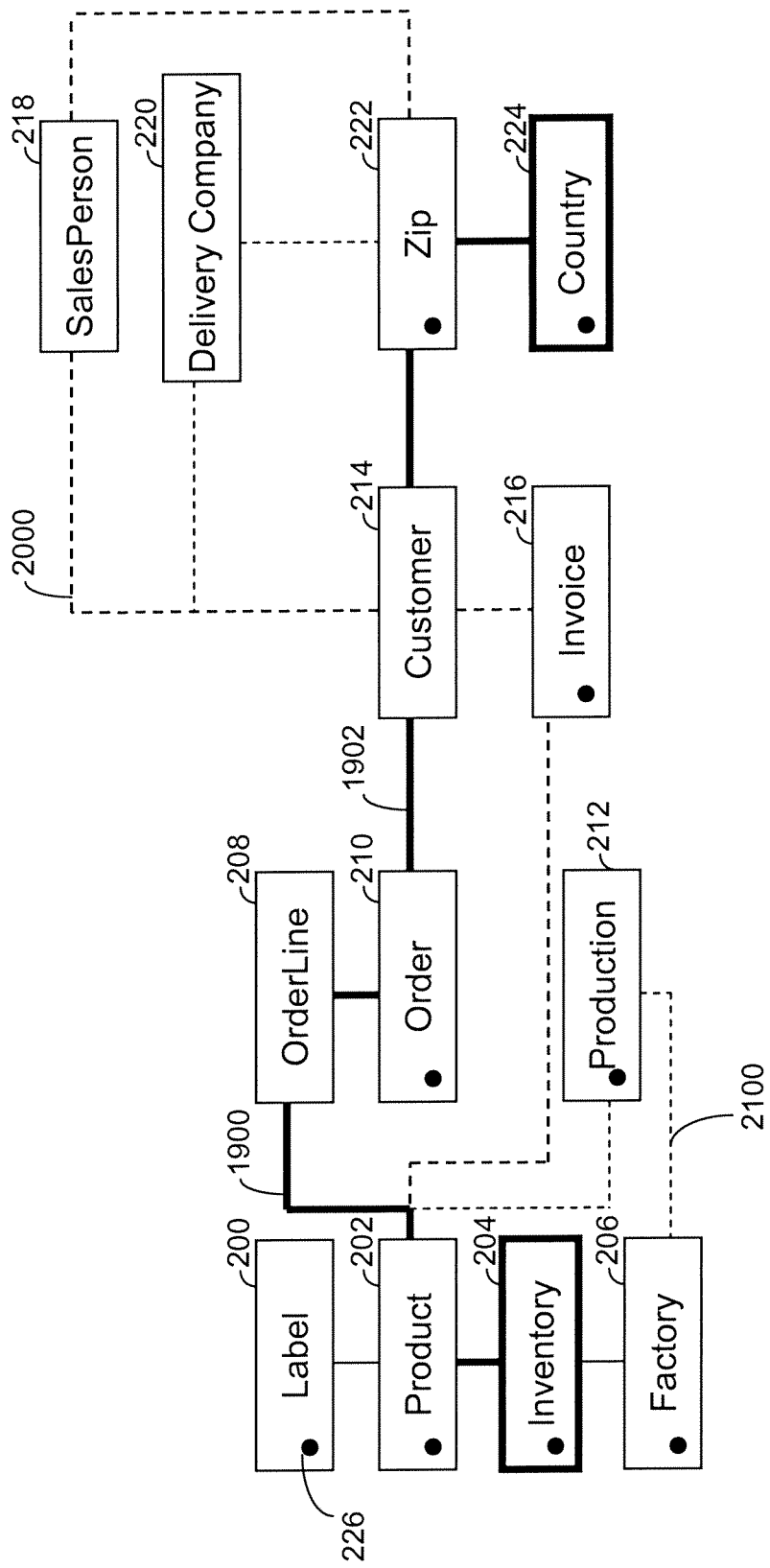

There is still a join from Inventory to Product within a loop. This join is excluded by the "Production" context and is mandatory for the "Inventory" context. However, we need not present the alternative to the user, because applying the "Production" context would make the query impossible to solve: this context isolates the "Inventory" object, which is requested by the query. So, without taking user input, the context module selects the only possible choice, the context "Inventory", as shown in FIG. 21.

Now, none of the joins involved in the path between the two tables is involved in a loop any longer (actually, in this example the final schema contains no loop at all, but this is not always true). So no ambiguity remains: with two choices (one between two contexts, one between three), the user has completely clarified the intended meaning of her query, which will retrieve the cumulated inventory levels of all products ordered by customers of each country.

Figure 22:
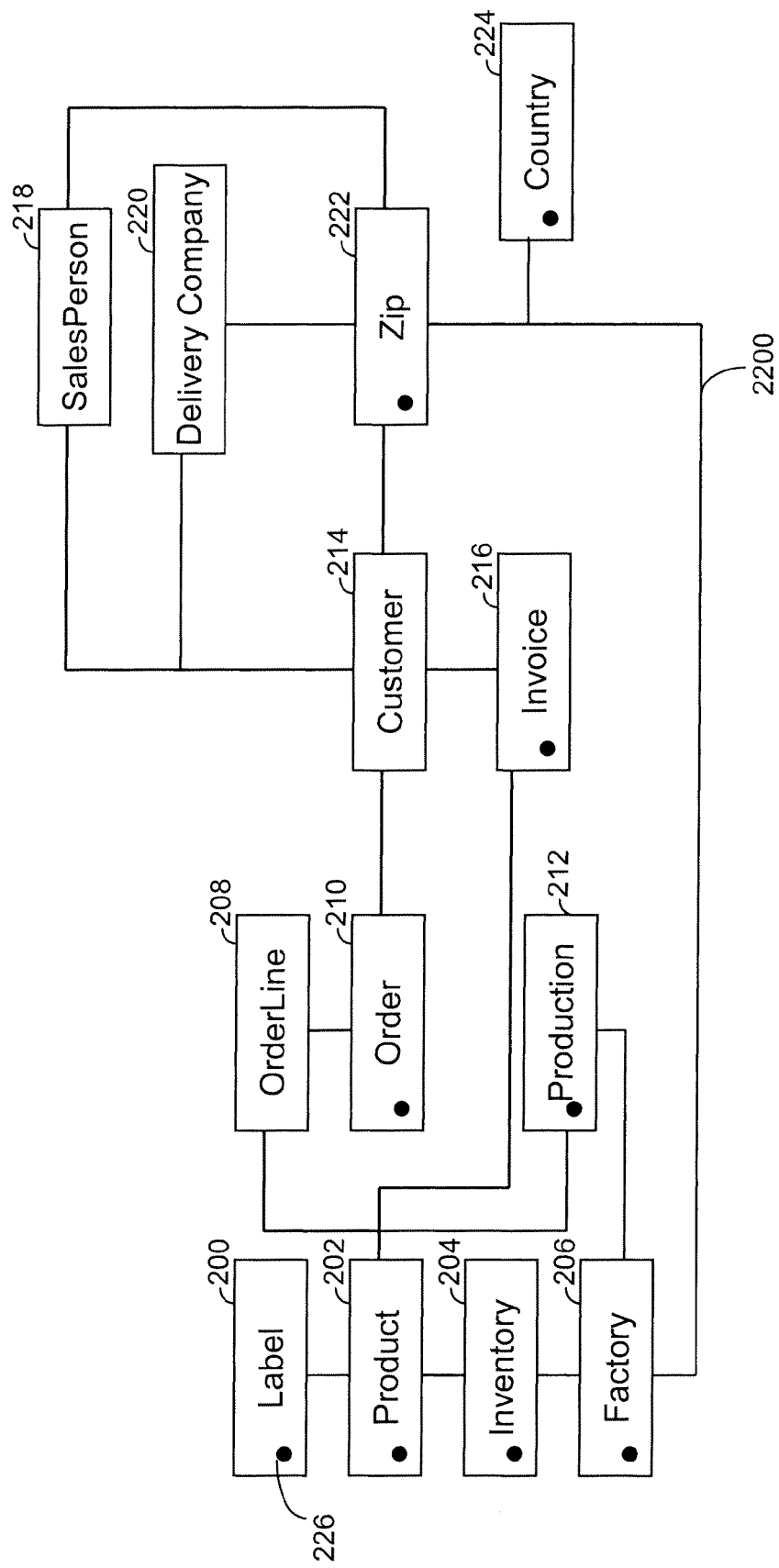
Figure 23:
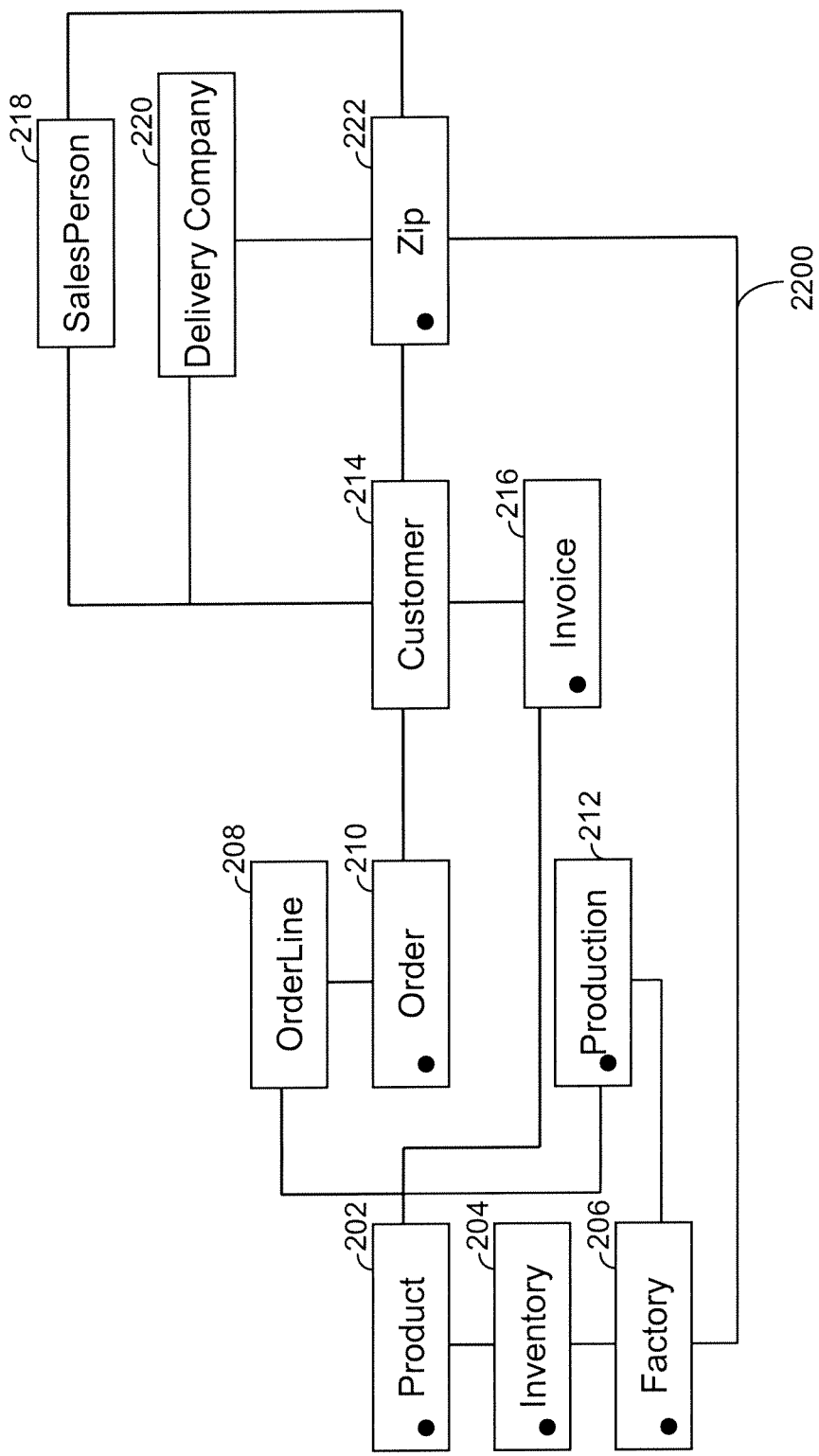

The disclosed IAGs are fairly simple, but in other cases they could be arbitrarily complex. In which case, a user might not easily make sense of all the joins. A refinement of the invention is to allow the nesting of contexts. As it appears, when joins are removed (as part of the context creation process), a single IAG can often be further decomposed into a set of smaller and simpler IAGs, each of which can be handled by local contexts. For instance, consider the schema of FIG. 22. This is the same schema as before, but there is a join 2200 between "Factory" and "ZIP" (because each factory is in a certain location). If IAGs are detected, in this case, there is only one large IAG that contains almost all of the original joins and tables, as shown in FIG. 23.

Between any two tables of this IAG, one can find at least two different join paths that do not share a common table, so we cannot decompose this schema into independent partial schemas. This makes the context creation exercise quite complex. Fortunately, we can extend our approach and create "nested contexts". The idea is that when we create a context by eliminating one or several joins in the IAG, we can run the IAG determination algorithm again and create independent sub-contexts "nested" inside the one we are defining.

Figure 24:
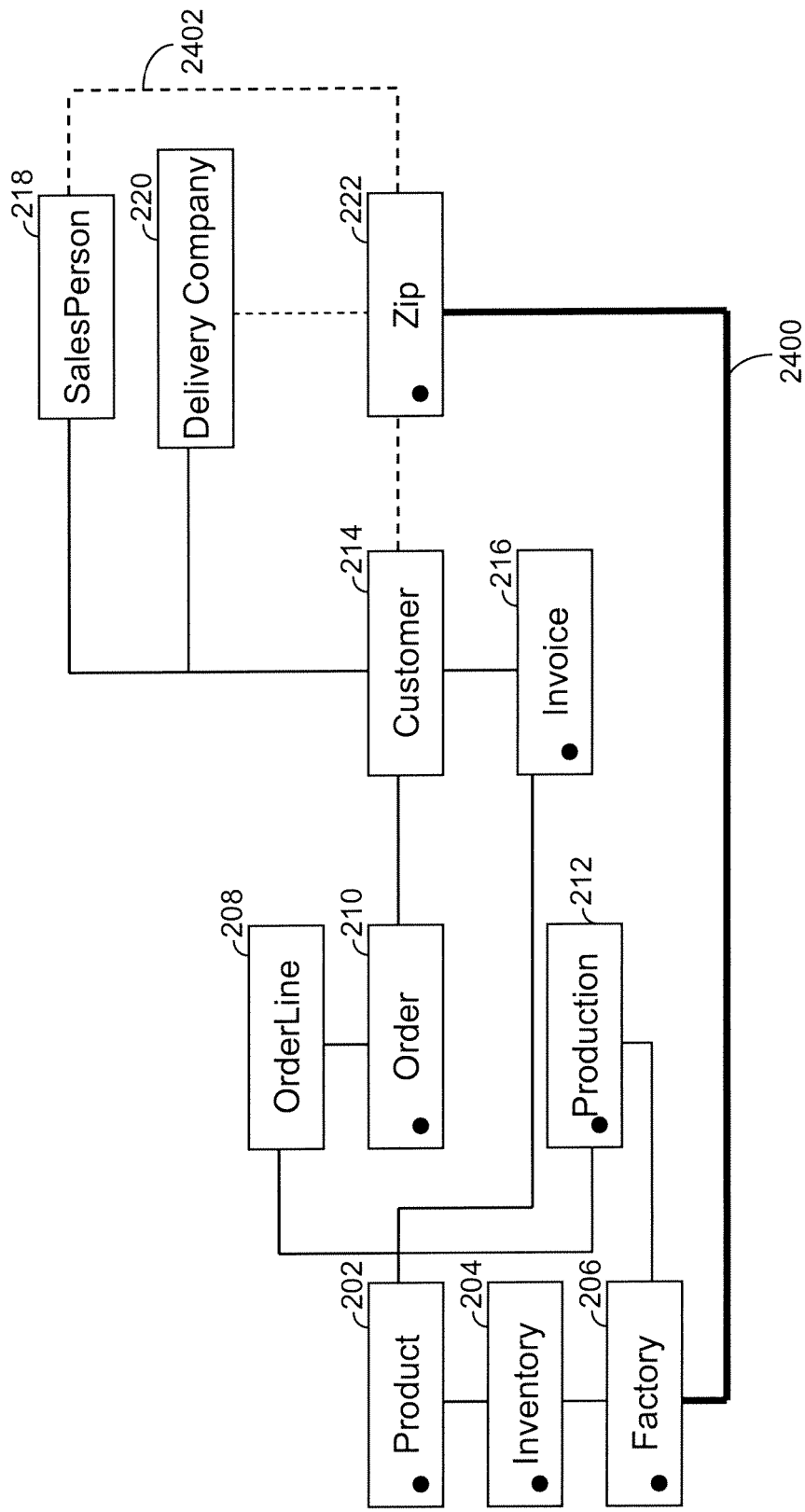

In this example, we notice that there are two main ways of relating factories and ZIP codes: we can use the direct join from a factory to its ZIP code or we can use some product and customer information to determine the ZIP codes we are interested in. To capture the first use case, we create a "Factory ZIP" context that forces the use of the link between both tables and eliminates all other joins towards a ZIP code. FIG. 24 shows the mandatory join 2400 and the excluded joins 2402.

Figure 25:
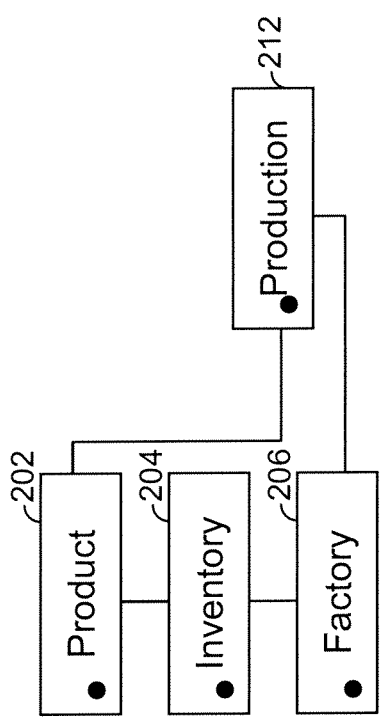
Figure 26:
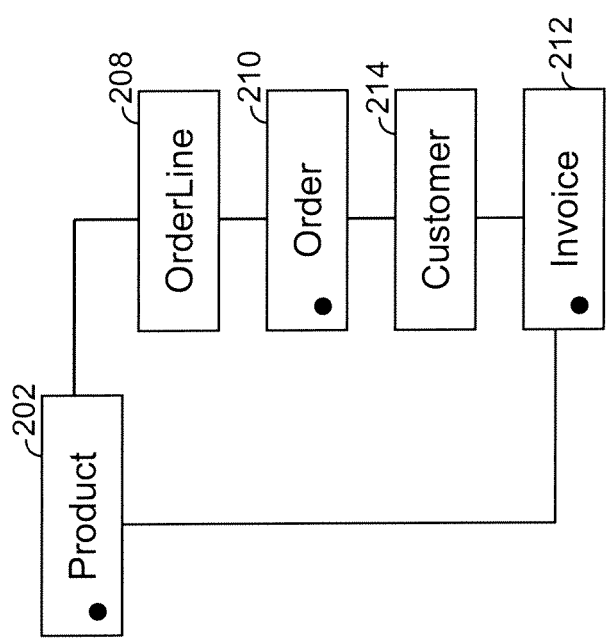

Inside this context, we can run the IAG detection algorithm again. This algorithm will determine two "sub-IAGs", one contains the tables involved with Products and Factories and is shown in FIG. 25. The second IAG contains the tables involved with Products and Customers and is shown in FIG. 26.

As it turns out, these IAG were previously considered in connection with FIGS. 16 and 17. For the "Product" context we create "Inventory" and "Production" contexts. For the "Product-Customer" context we create the "Order" and "Invoice" contexts. As a result, if the "father" context, "Factory ZIP", is selected, then the schema can be structured using these two independent pairs of contexts.

Figure 27:
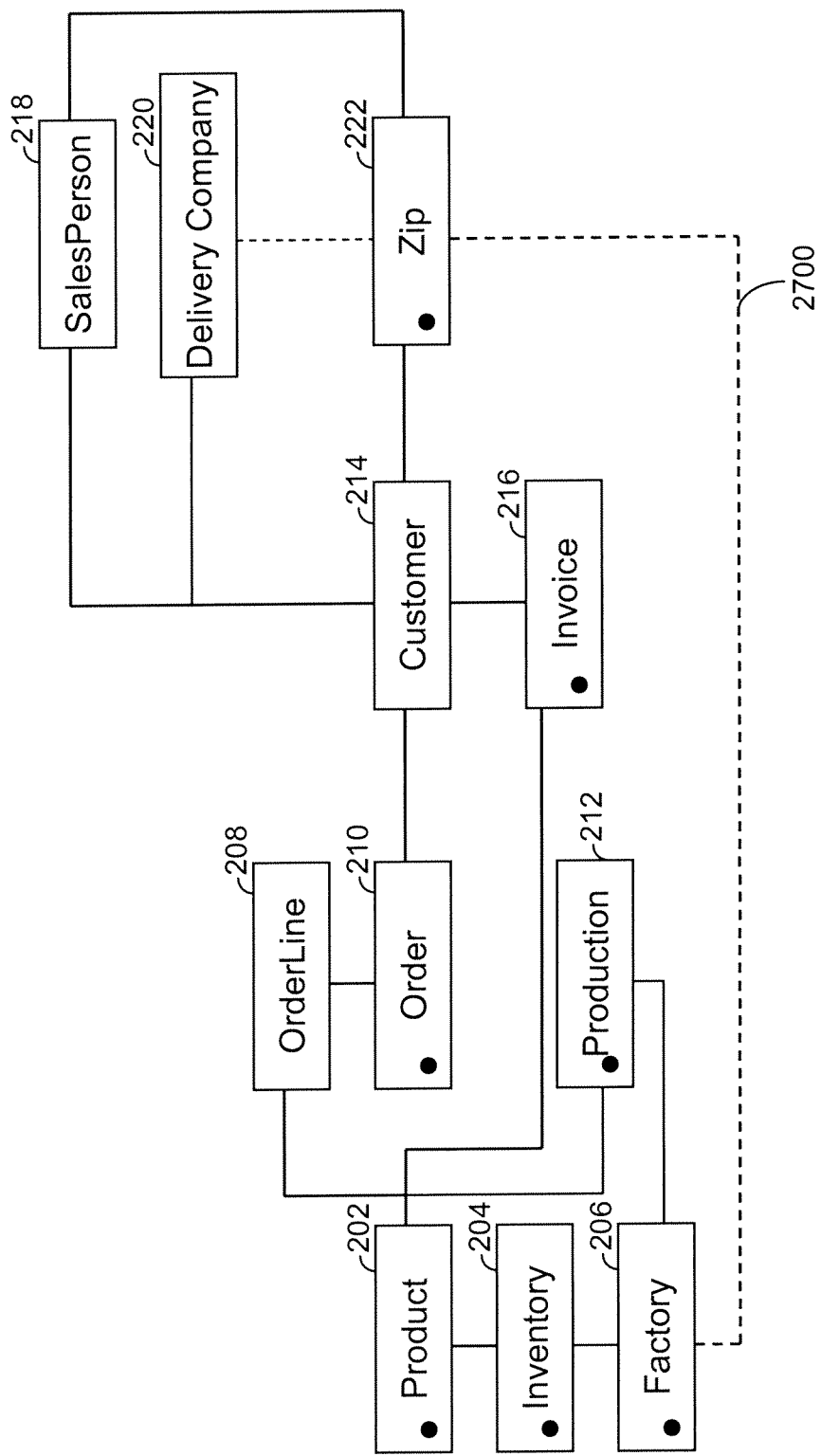

Now create another context in the original schema, one that simply excludes the direct link between a factory and its ZIP code (we call it "no factory ZIP"). FIG. 27 illustrates the excluded join 2700.

Here again, one can run IAG identification code of the context module 128. This results in the examples of the previous section: the schema can be divided into three IAGs, each of which can be handled by a set of contexts.

Finally, looking at the global picture, we observe that
Users can use the "Factory ZIP" or "No factory ZIP" context
Whatever their choice, they can choose the "Order" or "Invoice" context;
Independently, they can choose the "Production" or "Inventory" context;
Only if they have chosen the "No factory ZIP" can they chose one of the three contexts "Customer's ZIP", "Sales Person" or "Delivery Company".

We can thus organize our contexts in a network; a context that is a child of another one can be proposed to a user if its father has been selected by the user. In this case, "Customer's ZIP", "Sales Person" and "Delivery Company" are children of "No Factory ZIP" and will be proposed to the user if the latter has chosen to apply their father; all other contexts are independent.

The Pathfinder algorithm can be extended to handle nested contexts. We reformulate its step 3.1 as follows: build a list of all contexts for which A is either mandatory or excluded, and that allow at least one join to each table in the query, among all available contexts that do not have a father context or whose father has already been selected by the user.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions causing at least one computing system to:
derive, from a database schema, an irreducible ambiguous group comprising a sub-schema with a set of vertices wherein any two vertices are part of a loop and have at least two minimal paths relating them in the sub-schema, the sub-schema specifying a subset of a graph of the database schema and comprising a list of boundary tables and a list of object tables, the boundary tables connecting the sub-schema to other parts of the database schema, the object tables being used to define objects in a semantic layer;
receive user generated input designating joins in the sub-schema as excluded joins; and
define a context of the sub-schema by: finding a tree that connects all boundary tables of the sub-schema plus all of the object tables of the sub-schema while excluding the excluded joins the tree specifying mandatory joins and neutral joins.

2. The computer readable storage medium of claim 1 further comprising executable instructions to resolve a query using the context, wherein the context associates at least two tables specified by the query.

3. The computer readable storage medium of claim 2 further comprising executable instructions to process a selection of a context from multiple contexts invoked by a path characterizing the query.

4. The computer readable storage medium of claim 2 further comprising executable instructions to remove sub-schema joins that are excluded joins.

5. The computer readable storage medium of claim 2 further comprising executable instructions to remove any context with mandatory joins excluded by a selected element.

6. The computer readable storage medium of claim 1 further comprising executable instructions to form one context per fact table.

7. The computer readable storage medium of claim 1 further comprising executable instructions to build a list of irreducible ambiguous groups, each irreducible ambiguous group specifying a list of contained tables, the list of boundary tables, and a collapsed table associated with the irreducible ambiguous group.

8. The computer readable storage medium of claim 1 further comprising executable instructions to form a nested context.

9. The computer readable storage medium of claim 1 wherein the sub-schema includes at least one contained table, at least one boundary table and at least one collapsed table.

10. A method for implementation by at one or more data processors comprising:
   deriving, by at least one data processor from a database schema, a sub-schema with a set of vertices wherein any two vertices are part of a loop and have at least two minimal paths relating them in the sub-schema, the sub-schema specifying a subset of a graph of the database schema and comprising a list of boundary tables and a list of object tables, the boundary tables connecting the sub-schema to other parts of the database schema, the object tables being used to define objects in a semantic layer;
   receiving, by at least one data processor, data designating joins in the sub-schema as excluded joins; and
   defining, by at least one data processor, a context for the sub-schema by finding a tree that connects all boundary tables of the sub-schema plus all of the object tables of the sub-schema while excluding the excluded joins, the tree specifying mandatory joins and neutral joins.

11. A system comprising:
   at least one data processor;
   memory coupled to the at least one data processor, the memory storing instructions, which when executed, cause the at least one data processor to:
      derive, from a database schema, a sub-schema with a set of vertices wherein any two vertices are part of a loop and have at least two minimal paths relating them in the sub-schema, the sub-schema specifying a subset of a graph of the database schema and comprising a list of boundary tables and a list of object tables, the boundary tables connecting the sub-schema to other parts of the database schema, the object tables being used to define objects in a semantic layer;
      receive data designating joins in the sub-schema as excluded joins; and
      define a context for the sub-schema by finding a tree that connects all boundary tables of the sub-schema plus all of the object tables of the sub-schema while excluding the excluded joins, the tree specifying mandatory joins and neutral joins.

\* \* \* \* \*